United States Patent [19]
Coit et al.

[11] 3,938,588
[45] Feb. 17, 1976

[54] DEAERATING FEEDWATER HEATER

[75] Inventors: Roland L. Coit, Swarthmore; Robert G. Slebodnick, Collingdale, both of Pa.

[73] Assignee: Westinghouse Electric Corporation, Pittsburgh, Pa.

[22] Filed: Oct. 18, 1973

[21] Appl. No.: 407,723

[52] U.S. Cl. .............. 165/113; 165/114; 122/441; 210/180
[51] Int. Cl. .......................... F28b 1/02; F28b 9/10
[58] Field of Search .................. 165/110–114; 122/441; 165/161; 210/180

[56] References Cited
UNITED STATES PATENTS

| | | | |
|---|---|---|---|
| 1,626,849 | 5/1927 | Lucke | 165/114 |
| 1,764,716 | 6/1930 | Ehrhart | 165/112 |
| 1,935,864 | 11/1933 | Tinker et al. | 165/112 X |
| 2,114,873 | 4/1938 | Coulson, Jr. | 165/113 |
| 2,180,840 | 11/1939 | Tuley et al. | 165/114 |
| 2,812,164 | 11/1957 | Thompson | 165/161 X |
| 2,995,341 | 8/1961 | Danesi | 165/161 X |
| 3,101,595 | 8/1963 | Peters et al. | 122/441 X |
| 3,795,273 | 3/1974 | Brigida et al. | 165/114 X |

Primary Examiner—Albert W. Davis, Jr.
Attorney, Agent, or Firm—F. J. Baehr, Jr.

[57] ABSTRACT

A feedwater heater has a condensate inlet, and a flow distributor cooperatively associated with the condensate inlet, a plurality of U-shaped tubes forming a tube bundle, a vent condenser portion enclosing a portion of the cold leg of the tube bundle and a trough centrally disposed within the tube bundle to provide deaeration of the condensate. The trough has its lengthwise opening in fluid communication with the cold leg portion of the tube bundle and one end thereof in fluid communication with the vent condenser for channeling the non-condensibles to the vent condenser where they are vented from the feedwater heater.

8 Claims, 5 Drawing Figures

DEAERATING FEEDWATER HEATER

BACKGROUND OF THE INVENTION

1. Field of the Invention

This invention relates to feedwater heaters and more particularly to deaerating feedwater heaters utilized in nuclear steam power plants.

2. Description of the Prior Art

Steam generated by nuclear boiling water reactors, BWR, and utilized in turbo-generators to produce electrical power, contained from 10 to 30 part per million, ppm, of free oxygen resulting from the disassociation of water, which occurs as the water passes through the radioactive environment of the nuclear reactor and is heated to form steam. As the steam is passed through the turbine a portion thereof is extracted and utilized in feedwater heaters for regenerative feedwater heating. Free oxygen flowing with the extracted steam becomes dissolved in the condensed steam in the shell side of the feedwater heaters. As a result, the feedwater drain condensate contains from one to eight ppm of dissolved oxygen depending on the efficiency of the feedwater heater venting system. It has been the practice to cascade the feedwater drains back to the condenser, where deaeration can be accomplished. However, to improve the cycle efficiency of the BWR steam cycles, it is desirable to accumulate the feedwater heater condensate drains from several feedwater heaters in one heater and then pump the condensate drain fluid from this heater directly into the feedwater system. However, to do this, and prevent deleterious effects in the reactor and associated equipment, the oxygen concentration of the condensate drain fluid pumped into the feedwater system must have its oxygen content lowered to a range of approximately 70 parts per billion, ppb, to one ppm depending on the cycle. Thus, the one feedwater heater in which the condensate drain fluid is collected must have effective means disposed therein for deaerating the condensate drain fluid and removing the non-condensibles therefrom.

SUMMARY OF THE INVENTION

In general, a feedwater heater adapted to remove non-condensible gases from condensate drain fluid fed thereto, when made in accordance with this invention, comprises a tubular shell portion, a plurality of tubes forming a tube bundle so disposed in the shell that feedwater flows through the tubes when the heater is operating, a steam inlet nozzle disposed in the shell, a condensate drain fluid inlet nozzle also disposed in the shell and impingement protecting means disposed adjacent the condensate drain fluid inlet nozzle for protecting the tubes against direct impingement of the influent condensate drain fluid. The feedwater heater also comprises means for dispersing the influent condensate drain fluid, the dispersing means being so disposed to effectuate admixing of the dispersed condensate fluid and influent steam. Such a feedwater heater also comprises vent condensing means disposed adjacent at least a portion of the tubes receiving influent feedwater for condensing steam from the non-condensible gases and venting the latter and a trough extending lengthwise along the tubes, the trough being in fluid communication with the vent condenser and the tube bundle, whereby when the heater is operating, influent steam admixes with the dispersed condensate drain fluid driving the non-condensible gases out of solution and the steam and non-condensible gases flow via trough to the vent condenser, wherein steam is condensed and non-condensible gases are vented from the feedwater heater.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
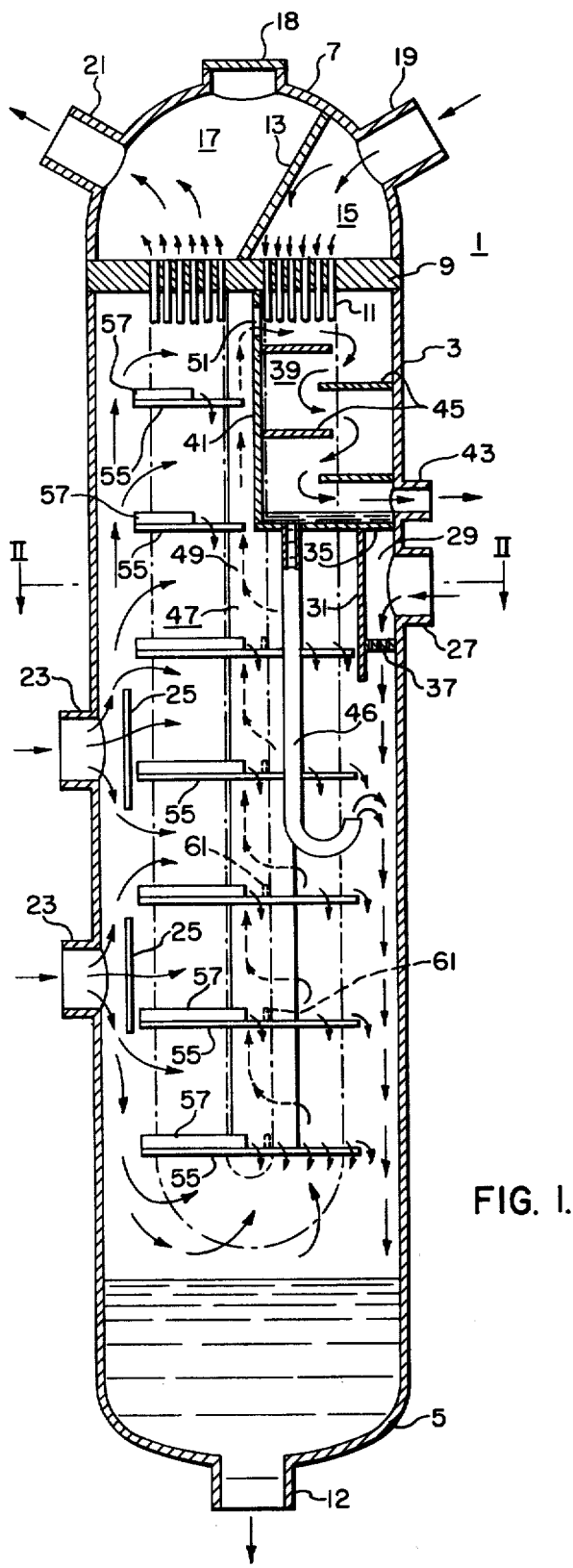
FIG. 1 is a sectional view of a feedwater heater made in accordance with this invention.

Referring now to the drawings in detail, FIG. 1 shows a vertically disposed deaerating feedwater heater 1 comprising a tubular shell portion 3 having a flanged and dish head portion 5 forming a lower end closure, and a spherical head portion 7 forming an upper end closure. A tube sheet 9 is made integral with the spherical head 7 and a plurality of U-shaped tubes 11 form a tube bundle, the ends of the tubes extend through the tube sheet and are fastened thereto by rolling, welding or other means.

The flanged and dished head 5 has a condensate drain nozzle 12 centrally disposed therein. The condensate drain nozzle 12 is in communication with the lower end of the shell and drains condensate therefrom.

The spherical head 7 has a dividing plate 13 angularly disposed therein to form a feedwater inlet chamber 15 and a feedwater outlet chamber 17, and to provide space for a manway 18. A feedwater inlet nozzle 19 is disposed in the spherical head in fluid communication with the feedwater inlet chamber 15. A feedwater outlet nozzle 21 is disposed in the spherical head 7 in fluid communication with the feedwater outlet chamber 17. Thus, the inlet and outlet chambers 15 and 17, respectively, form headers for the tube bundle so that the feedwater flows through the tubes 11 to form a cold leg portion, the portion on the right in FIG. 1, and a hot leg portion, the portion on the left as shown in FIG. 1.

Steam inlet nozzles 23 are disposed in the shell 3 so as to admit steam thereto. Impingement plates 25 are disposed adjacent the steam inlet nozzles 23 to prevent the influent steam from impinging directly upon the tubes 11.

Figure 2:
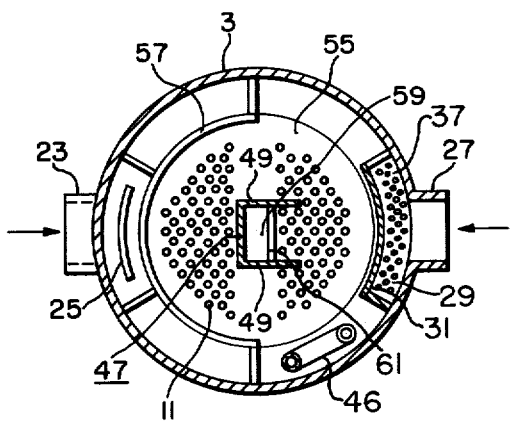
FIG. 2 is a sectional view taken on line II—II of FIG. 1.

A conduit drain inlet nozzle 27 is disposed in the shell for admitting condenstate drain fluid thereto. A flash chamber 29 is disposed in the shell adjacent the condensate drain fluid inlet nozzle 27. The flash chamber 29, as shown in FIGS. 1 and 2, comprises an arcuate plate 31 disposed generally parallel to the shell 3 and adjacent the nozzle 27; a pair of side plates 33 and 34 seal welded to the shell 3 and arcuate plate 31. A top plate 35 forms the top of the chamber 29 and a bottom perforated plate 37 is disposed on the bottom of the chamber so as to disperse the influent condensate drain fluid collected in the flash chamber 29. The steam inlet nozzles 23 are disposed to cooperate with the perforated plate 37 so that the dispersed influent condensate drain fluid admixes with the influent steam in a counterflow relationship to produce a scrubbing action on the dispersed condensate drain fluid and thereby liberate the entrained oxygen.

A vent condenser 39 is disposed in the shell adjacent the tube sheet 9, the vent condenser 39 has walls 41 which cooperate with the shell 3 to encompass at least a portion of the coldest part of the cold leg portion of the tube bundle as it encloses that portion of the tube bundle receiving the influent feedwater. The vent condenser 39 has a vent nozzle 43 and a plurality of baffles 45 disposed therein so as to cause the fluid flowing therethrough to follow a sinuous path over the tubes to condense steam therefrom as the fluid flows to the vent nozzle 43 and is vented from the feedwater heater. A J trap or loop seal 46 drains condensate from the vent condenser 39.

A U-shaped vent channel or trough 47 is centrally disposed within the tube bundle so that the side walls 49 extend into the cold leg portion of the tube bundle, thus, the lengthwise opening of the trough 47 is in fluid communication with the entire length of the cold leg portion of the tube bundle. The upper end of the trough 47 is in fluid communication with the vent condenser 39 via an opening 51 in one of the walls 41 adjacent the tube sheet to provide oxygen scavenging of the entire tube bundle and prevent the formation of high oxygen concentration in the main condensing zones of the feedwater heater. With the walls 49 of the trough 47 extending into the cold leg portion of the tube bundle a maximum amount of steam is removed from the non-condensibles flowing via the trough 47 to the vent condenser 39.

A plurality of tube supports and condensate collecting plates 55 are disposed transverse to the tube bundle and at regular intervals along its length. The condensate collecting plates 55 have a dam 57 extending upwardly from approximately ½ of the outer periphery thereof causing the condensate of flow from only one side thereof. The condensate collecting plates 55 have a central opening 59 extending therethrough. The opening is adapted to accommodate the trough 47 which passes therethrough. A dam 61 extends upwardly from one edge of the opening 59 to prevent condensate from running into the trough 47. The dam 57 is disposed adjacent the hot leg portion of the tube bundle.

The above mentioned components are cooperatively associated to disperse the condensate drain fluid so that it comes into contact with the influent steam, whereby the condensate, which collects in the bottom of the shell, is subjected to a maximum amount of oxygen scavenging resulting in a low concentration of oxygen in the condensate and the non-condensibles are removed via the trough 47 from all portions of the shell, providing a primary venting and condensing stage throughout the heater and then the non-condensibles flow through the vent condenser portion, which acts as a second condensing zone. The non-condensibles are then vented from the heater to produce a condensate having a very low quantity of free oxygen.

Figure 5:
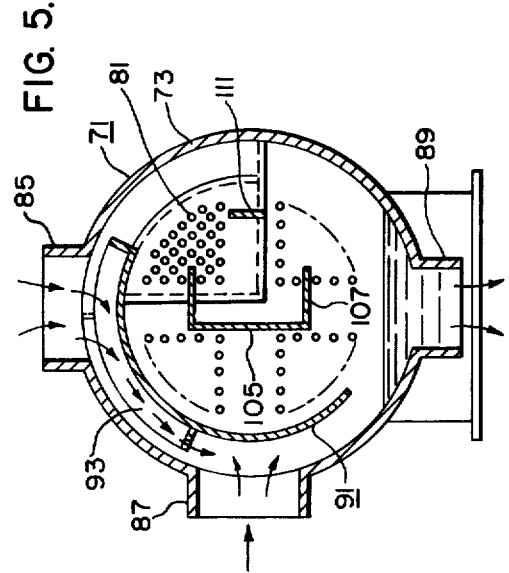
FIG. 5 is a sectional view taken on line V—V of FIG. 3.
Figure 4:
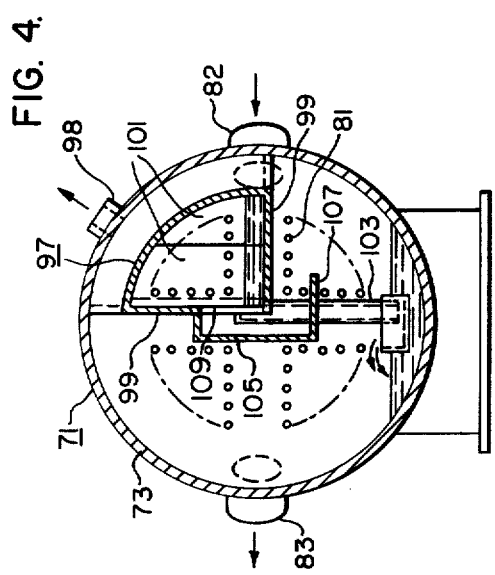
FIG. 4 is a sectional view taken on line IV—IV of FIG. 3.
Figure 3:
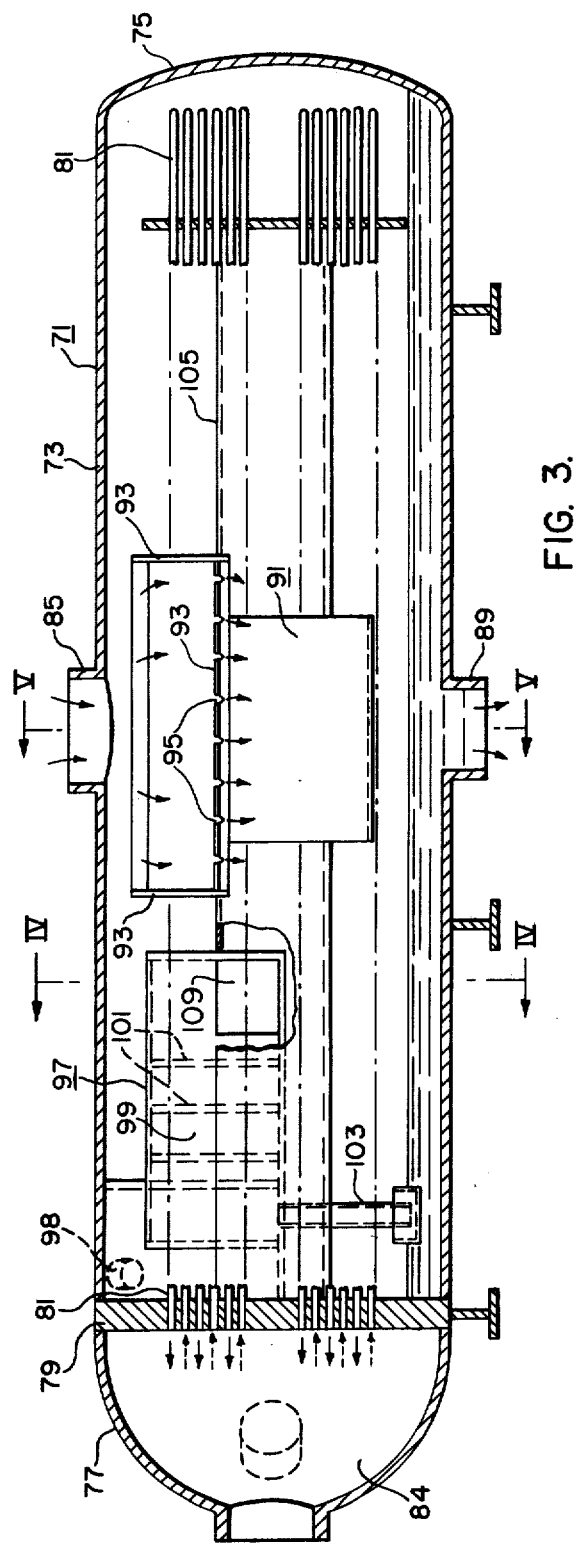
FIG. 3 is a sectional view of an alternative feedwater heater made in accordance with this invention.

FIGS. 3, 4 and 5 show a horizontally disposed deaerating feedwater heater 71 which comprises a tubular shell portion 73, a flanged and dished head 75 forming a closure for one end thereof and a spherical head portion 77 forming a closure of the other end thereof.

The spherical head portion has a tube sheet 79 associated therewith and a plurality of tubes 81 which are disposed lengthwise in the shell and have their ends disposed to pass through the tube sheet and be fastened thereto by rolling, welding or other means.

A feedwater inlet nozzle 82 and a feedwater outlet nozzle 83 are disposed in the spherical head along with a dividing plate 84 forming a feedwater inlet chamber and a feedwater outlet chamber which act as headers for the tubes, whereby the feedwater flows through the tube bundle forming a cold leg portion and a hot leg portion thereof.

A condensate drain fluid inlet nozzle 85, a steam inlet nozzle 87 and a condensate drain outlet nozzle 89 are disposed approximately 90° apart adjacent the central portion of the shell. The condensate drain fluid inlet nozzle 85 is disposed in the upper portion of the shell 73 and the condensate drain outlet nozzle is disposed in the lower portion of the shell 73.

An impingement plate 91 is disposed generally parallel to the shell and adjacent the inlet nozzles 85 and 87 to prevent the influent fluids from impinging directly upon the tubes 81. The portion of the impingement plate 91 adjacent the condensate drain inlet nozzle 85 is disposed to cooperate with side walls 93 to form a tray, one of the walls has a plurality of V-shaped notches 95 disposed therein forming weirs. The weirs are disposed slightly above the steam inlet nozzle 87 causing the condensate drain fluid to be dispersed and flow downwardly into the region in which the influent steam enters the vessel causing admixing of the two fluids to effectively scour the influent condensate drain fluid to liberate entrained oxygen therefrom. A vent condenser 91 is disposed adjacent the tube sheet 79 and encompasses a plurality of the coldest tubes. The vent condenser 91 comprises a vent nozzle 98, walls 99 and baffles 101 which cooperate to cause the fluid flowing therethrough to follow a sinuous path over the cold tubes 81 to remove condensate from the non-condensibles flowing through the vent condenser 91 prior to the non-condensibles being vented through the vent nozzle 98.

A drain pipe 103 is in fluid communication with the lower portion of the vent condenser 91 and extends downwardly to below the top of the level of the condensate drain fluid maintained in the lower portion of the shell of the heater to provide a seal leg for draining the condensate from the vent condenser 91.

A U-shaped vent channel or trough 105 is centrally disposed within the tube bundle and has side walls 107 that extend into the cold leg portion thereof, thus, the lengthwise opening of the trough 105 is in fluid communication with the entire length of the cold leg portion of the tube bundle. One end of the trough 105 is in fluid communication with the vent condenser 97 via an opening 109 in the wall 99 of the vent condenser 97 to provide oxygen scavenging of the entire tube bundle and to prevent the formation of high oxygen concentrations in the main condensing zone of the heater.

A baffle 111 is disposed lengthwise between sections of the cold leg portion of the tube bundle to cause steam to flow across the cold leg of the tube bundle before it enters the trough 105 and thereby condense the maximum amount of steam flowing with non-condensibles.

The feedwater heater herein before described has components which are cooperatively associated to disperse the condensate drain fluid so that it comes into contact with the influent steam thus, the condensate, which collects in the bottom of the shell, has been subjected to a maximum amount of oxygen scavenging, resulting in a low concentration of oxygen in the condensate, and the non-condensibles are removed via the trough from all portions of the shell. Such a heater has a primary vent condensing stage throughout the tube bundle, which maintains a low concentration of oxygen in the main condensing zone and provides a second vent condensing area prior to the non-condensibles being vented therefrom, whereby the condensate drain effluent from the heater has a very low quantity of free oxygen therein and the heater operates efficiently.

What is claimed is:

1. A feedwater heater adapted to remove non-condensible gases from condensate drain fluid fed thereto, said heater comprising a tubular shell portion; a plurality of tubes forming a tube bundle so disposed in said shell portion that feedwater flows through the tubes when the heater is operating to form a cold leg portion and a hot leg portion; a steam inlet nozzle disposed in said shell; a condensate drain fluid inlet nozzle disposed in said shell; impingement protecting means disposed adjacent said condensate drain fluid inlet nozzle for protecting the tubes against the direct impingement of said influent condensate drain fluid; means for dispersing said influent condensate drain fluid; said dispersing means being so disposed to effectuate admixing of the dispersed condensate drain fluid with influent steam; vent condensing means disposed to encompass a portion of the cold leg and having baffles disposed therein to cause the fluid flowing therethrough to follow a sinuous path over the tubes in order to condense steam from non-condensible gases and means for venting the non-condensible gases therefrom; and a single U-shaped trough generally centrally disposed with respect to the tube bundle and generally extending lengthwise along the entire length of the tube bundle, said trough being in direct fluid communication with the vent condensing means and with the cold leg portion of the tube bundle, said trough having leg portions each of which extend into the cold leg portion of the tube bundle, subtending a portion of the tubes therein, whereby, when the heater is operable influent steam advixes with the dispersed condensate drain fluid driving the non-condensible gases out of solution, and the steam and non-condensible gases must flow over tubes of the cold leg portion to enter the trough and then flow via the trough to the vent condensing means, wherein steam is condensed and non-condensible gases are vented from the feedwater heater.

2. A feedwater heater as set forth in claim 1, wherein the vent condensing means is disposed adjacent the feedwater inlet end of the cold leg portion of the tube bundle.

3. A feedwater heater as set forth in claim 1 wherein the axis of the shell is generally vertically oriented and the vent condensing means is disposed adjacent the upper end of the shell.

4. A feedwater heater as set forth in claim 3, and further comprising a plurality of tube support plates generally disposed transverse to the tubes, whereby condensate collects on said support plates and flows over the edge thereof cascading from plate to plate and thereby exposing the condensate to the scavenging action of steam supplied via the steam inlet nozzle.

5. A feedwater heater as set forth in claim 4, wherein the tube support plates have a collar disposed adjacent one portion of the periphery thereof whereby the condensate flows over only that portion adjacent the portion having the collar.

6. A feedwater heater as set forth in claim 5 wherein the support plates have a central opening disposed therein and the trough passes through the central opening and one edge of said opening having a collar for preventing condensate from flowing from said plate into said trough.

7. A feedwater heater as set forth in claim 1, wherein the impingement protecting means is also disposed adjacent the steam inlet nozzle to protect the tubes against direct impingement of influent steam.

8. A feedwater heater as set forth in claim 7, wherein the impingement protecting means comprises side walls forming a tray for collecting influent condensate drain fluid and the means for dispersing said influent condensate drain fluid comprises a plurality of notches in the wall of said tray, said notches being disposed above said steam inlet nozzle.

* * * * *